Feb. 24, 1959   E. P. SCHREYER   2,875,314
STEAM GENERATORS
Filed May 3, 1957
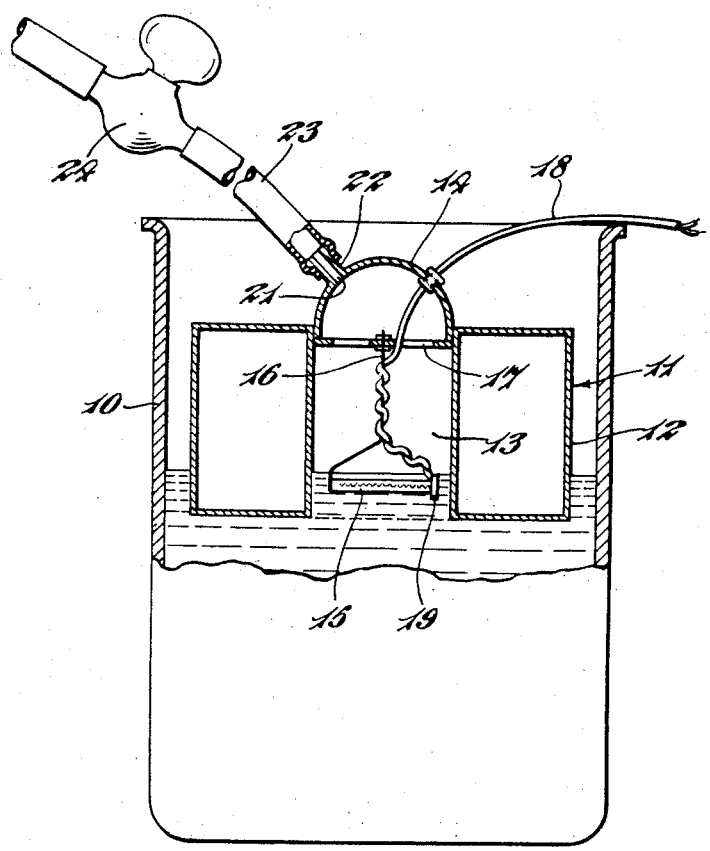
INVENTOR
Edward Peter Schreyer
BY
Dean, Fairbank, + Hirsch
ATTORNEYS

United States Patent Office 2,875,314
Patented Feb. 24, 1959

2,875,314

STEAM GENERATORS

Edward P. Schreyer, Ridgefield, Conn.

Application May 3, 1957, Serial No. 656,958

3 Claims. (Cl. 219—38)

This invention relates to steam generators, and has for its object to provide a steam generator which is simple, is completely free from any risk of bursting due to excess pressure, and may readily be made in portable form.

Such a steam generator has many uses, such as for supplying steam to smoothing irons and for cleaning buildings and the like, and it can be used without skilled supervision.

A steam generator according to the invention comprises a water container, a float adapted to be supported by water in said container and enclosing a bell-shaped cavity, a heating element mounted in said cavity so as to be just immersed in the water when the float is supported by the water in the container, and an outlet for the escape of steam from said cavity.

The float may comprise a hollow ring the central opening of which is closed at its upper end to define the cavity.

Means may be provided to close the steam outlet and thereby trap steam in the cavity to reduce the internal water level relative to the float, thus bringing the heating element clear of the water, and thermostatic means are provided, responsive to the temperature of the heating element, to render the said element inoperative when out of the water.

The invention is hereinafter described with reference to the accompanying diagrammatic drawing, which shows a vertical cross-section of a steam generator according to the invention.

Referring to the drawing, a water container 10, which may be made of sheet metal has within it a float 11 in the form of a hollow ring 12 the central opening 13 in which is closed at its upper end by a domed cover 14, the cover preferably being removable but making a steam-tight joint with the ring.

An electric heating element 15 is supported inside the central opening of the ring 13, for example, as shown in the drawing by a rod 16 depending from a spider 17 below the cover 14, the heating element 15 being so positioned that, when the float 11 is supported by water in the container, the said element is just immersed in the water. Insulated conductors 18 passing through the cover 14 are provided to connect the heating element 15 to an electric current supply, and a thermostatically controlled switch 19, responsive to the temperature of the heating element, is provided to control the supply of current to the heating element.

A steam outlet opening 21 is provided in the cover 14, a short metal tube 22 being fixed to the cover around the outlet. A flexible pipe 23 is secured to the tube 22 to convey the steam to the point of use. A cock 24 is mounted at a suitable point in the pipe 23 as shown, or a valve-controlled nozzle is provided at the remote end of the pipe, to control the supply of steam.

The water container may be provided with a lid, and may have handles to enable it to be carried, or may be mounted on wheels or casters.

When electric current is supplied to the heating element, steam is generated substantially instantaneously. As the heating unit is at the surface of the water within the float, substantially no heat is taken up by the water outside the float, no convection currents being produced. The container therefore remains cool, and no appreciable heat is wasted. If the steam generated is allowed to escape through the outlet 21 the heating element remains immersed in the water and steam is generated continuously. If, however, the cock 24 is closed, steam pressure builds up in the interior of the float, tending to lift it and to depress the water level therein, so that the heating element is moved out of the water, and generation of steam ceases. The heating element being no longer surrounded by water, its temperature rises, and the thermostatically operated switch operates to cut off the current. Thus only a predetermined pressure, determined by the weight of the float, can be built up in the interior of the float, and there is no risk whatever of accidents due to the generation of excessive steam pressure.

Steam can be generated continuously so long as there is sufficient water in the container to support the float, and the container can be re-filled whilst steam is being generated.

The float 11 may be of any shape or form which provides a downwardly-opening bell-shaped cavity to receive the heating element.

I claim:

1. A steam generator comprising a water container, a float adapted to be supported by water in said container and enclosing a bell-shaped cavity defining a steam dome having a closed upper end and an open lower end adapted to be immersed in the water when the float is supported thereby, a heating element mounted in said cavity and positioned near the lower end thereof so as to be just immersed in the water when the float is supported by the water in the container, and an outlet for the escape of steam from said cavity, means to close the steam outlet and thereby trap steam in the cavity to reduce the internal water level relative to the float, thus bringing the heating element clear of the water, and thermostatic means responsive to the temperature of the heating element, to render the latter inoperative when out of the water.

2. A steam generator according to claim 1, wherein the float comprises a hollow ring the central opening of which is closed at its upper end to define the cavity.

3. The steam generator according to claim 1 wherein means are provided to close the steam outlet and thereby trap steam in the cavity to reduce the internal water level relative to the float, thus bringing the heating element clear of the water, and thermostatic means are provided, responsive to the temperature of the heating element, to render the said element inoperative when out of the water.

References Cited in the file of this patent

UNITED STATES PATENTS

| | | |
|---|---|---|
| 1,017,874 | Kelso | Feb. 20, 1912 |
| 1,909,973 | Lewis et al. | May 23, 1933 |
| 2,421,311 | Binnington | May 27, 1947 |
| 2,617,010 | Schmitz | Nov. 4, 1952 |